April 5, 1966 MASAMITSU KAWAKAMI 3,243,951

FLEXURE VIBRATION TYPE ELECTRICAL VIBRATOR AND TRANSISTOR OSCILLATOR UTILIZING THE SAME

Filed Sept. 11, 1962

3,243,951
Patented Apr. 5, 1966

3,243,951

FLEXURE VIBRATION TYPE ELECTRICAL VIBRATOR AND TRANSISTOR OSCILLATOR UTILIZING THE SAME

Masamitsu Kawakami, Setagaya-ku, Tokyo-to, Japan, assignor to Kabushiki Kaisha Toko Radio Coil Kenkyusho, Tokyo-to, Japan, a joint-stock company of Japan Filed Sept. 11, 1962, Ser. No. 222,789
Claims priority, application Japan, Mar. 28, 1962, 37/11,417
7 Claims. (Cl. 58—23)

Figure 1:
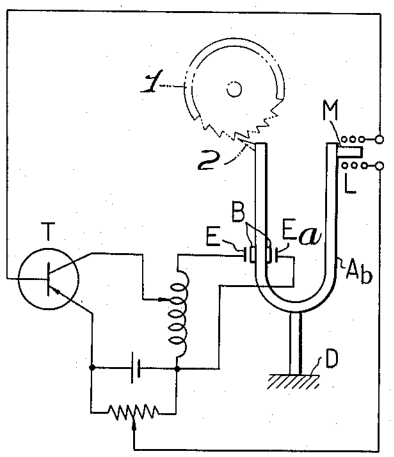

This invention relates to electrical vibrators for oscillation which are highly suitable as driving power sources of such devices as, for example, electronic timekeepers, and more particularly it relates to a novel two-terminal pair, flexure-vibration type, electrical vibrator and to a transistor oscillator wherein the said vibrator is utilized.

It is an object of the present invention to eliminate various disadvantages of conventional two-terminal pair, flexure-vibration type, electrical vibrators for oscillation, as will be described hereinafter.

Figure 2:
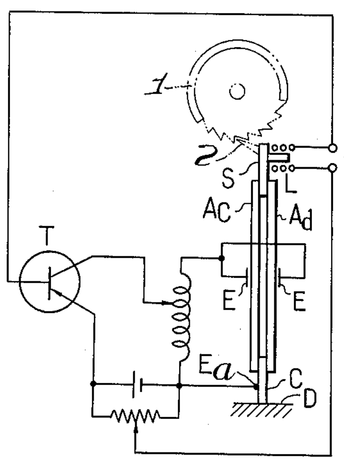

The details of the invention will be more clearly apparent from a consideration of the following description and accompanying illustrations in which like parts are designated by like reference numerals and letters, and in which:

FIG. 1 is a circuit diagram showing one embodiment of the present invention; and FIG. 2 is a circuit diagram showing another embodiment of the present invention.

In order to eliminate disadvantages occurring with devices according to the prior art, it is an object of the present invention to combine the above-described two systems in a logical manner and to provide, thereby, electrical vibrators and oscillators of micro-miniature size which can be caused to oscillate by extremely low powers.

An embodiment of the invention which is applied to a conventional vibrating body A*b* of the tuning-fork type will first be described with reference to FIG. 1.

According to this invention, a magnetic member M and a coil L related thereto are provided on only one of the two free ends of the tuning-fork type vibrating body A*b*, the coil L being connected to the base of a transistor T. The other side of the tuning-fork type vibrating body A*b* is coupled at its flexure part in an electrostatic manner to the collecter side of the transistor T. That is, in FIG. 1, pieces of electrostrictive (or piezo-electric) material B, B are bonded to the said other side of the vibrating body A*b* to be interposed between electrodes E and E*a* secured thereto. In this case, one of the free ends of the vibrating body A*b* is convenient and effective for attachment of such means as, for example, a driving means 2 for driving the wheel train 1 of a timekeeper.

In this case, wherein, as described above, one free end of the vibrating body A*b* is coupled electromagnetically, the flexure part of the other side is coupled electrostatically, this electrostatically coupled part is driven by means of the collector side of the transistor T, and the base of the transistor T is excited by means of the output generated in the electromagnetically coupled part of the said free end, impedance matching can be easily obtained on both the collector side and the base side, and ample oscillation can be caused with the use of extremely low electric power. Moreover, since the base side has low impedance, the coil L can be made small. Accordingly, it is possible to provide in practical form an oscillator which is of micro-miniature size which is substantially smaller than that of conventional oscillators intended for the same purpose.

FIG. 2 illustrates an embodiment of the invention wherein it is applied to a vibrator with extremely high value of Q. This vibrator consists of two vibrating elements A*c* and A*d* made of a polarized electrostrictive material or a piezo-electric material, which are separated at their free ends by a spacer S of suitable material interposed therebetween and at their fixed ends by a member C of high compliance, for example, beryllium copper, and is fixed to a supporting base D by securing the extended end of the said member C to the base D.

At the free end of the vibrator, the spacer S has an outwardly extending part which is provided with a magnetic member M and a coil L. One terminal of this coil L is coupled electromagnetically to the base side of a transistor T, while, on the other hand, the flexure part of the vibrator is coupled electrostatically to the collector side of the transistor T. That is, as indicated in FIG. 2, the said flexure part is provided on its outer opposite sides with electrodes E, E, and an inner side electrode E*a* is provided at the fixed end of the vibrator (the member C functioning additionally as this inner electrode E*a*). In this case also, driving means 2 can be provided on the spacer S.

In the case of this embodiment also, since the free end of the vibrator is coupled electromagnetically, and the flexure part is coupled electrostatically, impedance matching can be easily attained on both the collector side and the base side, similarly as in the case illustrated in FIG. 1. In this case, especially the Q value of the vibration is highly improved, and it has been found through experiments that, at frequencies of 100 through 200 cycles per second, the value of Q becomes approximately 1,000 to 1,700 (as compared with approximately 50 to 150 in the conventional case).

Furthermore, the proportion of output relative to input also becomes extremely large. At a frequency $f$ equal to 100 through 200 cycles per second, a mechanical vibration of amplitude of the order of approximately 6.3 mm., is generated with an input of 2 volts. Thus, even with extremely low input power, oscillation can be easily obtained; wherefore, it is possible to provide transistor oscillators of micro-miniature size.

While in the foregoing disclosure two embodiments of the present invention have been described, the essential features of the invention are that the free end and flexure part of a flexure-type electrical vibrator are coupled electromagnetically and electrostatically, respectively, to a prescribed electrical circuit, and that this electrostatically coupled part is driven by means of the collector side of a transistor the base of which is excited by means of the output generated in the electromagnetically coupled part. The present invention can be applied to any kind of vibrator provided that the vibrator is of the flexure type.

Although this invention has been described with respect to two particular embodiments thereof, it is not to be so limited as changes and modifications can be made therein which are within the full intended scope of the invention, as defined in the appended claims.

What is claimed is:

1. An electrical vibrator comprising, in combination, a pair of flexure-vibrating elements of electrostrictive material; first and second spacers disposed between said elements at the upper and lower ends thereof; first electrodes respectively provided in intermediate position at the outsides of said flexure-vibrating elements; a transistor; a ground electrode disposed between said flexure-vibrating elements; said first spacer being provided with an electromagnetic coupling part consisting of a magnetic body, a coil wound thereabout, said coil being electrically connected to the base of said transistor; a support; said second spacer being of a metal of high compliance, the one end of said spacer projecting beyond said flexure-vibrating elements and being affixed to said support; said first electrodes being electrically connected to the collector side of said transistor; the lead wire of said ground electrode being led out through said second spacer; the intermediate portions of said flexure-vibrating elements being electrostatically driven by the output derived from the collector side of said transistor; and said transistor being excited at its base side by the output power produced in said electromagnetic coupling part.

2. The vibrator as defined in claim 1, wherein said flexure-vibrating elements are identical rods in parallel position to each other.

3. The vibrator as defined in claim 1, wherein said first electrodes are disposed substantially in the center of said flexure-vibrating elements, opposite each other.

4. An electrical vibrator comprising, in combination, a pair of rod-shaped, parallel, elements of electrostrictive material; a first and a second spacer disposed between the ends of said elements; a pair of first electrodes disposed substantially in the center of each said element, opposite each other and at the outside of said elements; a transistor; a ground electrode disposed inside said flexure-vibrating elements; said first spacer being provided with an electromagnetic coupling part consisting of a magnetic body and a coil wound thereabout, said coil being electrically connected to the base of said transistor; a support; said second spacer being of a metal of high compliance, one end of said spacer projecting beyond said elements and being fixed to said support; said first electrodes being electrically connected to the collector side of said transistor; the lead wire of said ground electrode being led out through said second spacer; the intermediate portions of said elements being electrostatically driven by the output derived from said electromagnetic coupling part.

5. The vibrator as defined in claim 4, wherein said metal of high compliance is beryllium copper.

6. The vibrator as defined in claim 4, wherein said pair of elements is of a material selected from the group consisting of polarized electrostrictive and piezo-electric materials.

7. An electrical vibrator comprising, in combination, a pair of rod-shaped parallel elements of a material selected from the group consisting of polarized electrostrictive and piezo-electric material; a first and a second spacer disposed between the ends of said elements; a pair of first electrodes disposed substantially in the center of said elements, on the outsides thereof and facing each other; a transistor; a ground electrode disposed inside said elements; said first spacer being provided with a single electromagnetic coupling part consisting of a magnetic body and a coil wound thereabout, said coil being electrically connected to the base of said transistor; a support; said second spacer being of beryllium copper thus having high compliance, one end of said spacer projecting beyond said elements and affixed to said support; said first electrodes being electrically connected to the collector side of said transistor; the lead wire of said ground electrode being led out through said second spacer; the intermediate portions of said elements being electrostatically driven by the output derived from said electromagnetic coupling part.

References Cited by the Examiner

UNITED STATES PATENTS

| | | | |
|---|---|---|---|
| 200,032 | 2/1878 | Edison | 318—37 |
| 694,778 | 3/1902 | Perret | 310—20 |
| 1,849,271 | 3/1932 | Bower | 331—155 |
| 1,884,547 | 10/1932 | Bower | 58—23 |
| 2,908,174 | 10/1959 | Hetzel | 74—128 |
| 2,950,447 | 8/1960 | McShan | 331—116 |
| 3,061,796 | 10/1962 | Schoninger | 331—110 |

FOREIGN PATENTS

| | | |
|---|---|---|
| 761,609 | 11/1956 | Great Britain. |

LEO SMILOW, *Primary Examiner.*

JOSEPH P. STRIZAK, LEYLAND M. MARTIN, GERALD F. BAKER, *Assistant Examiners.*